March 3, 1953 — R. M. BROWN — 2,630,036
MAGNETIC FASTENER-HOLDING DEVICE
Filed Sept. 16, 1948
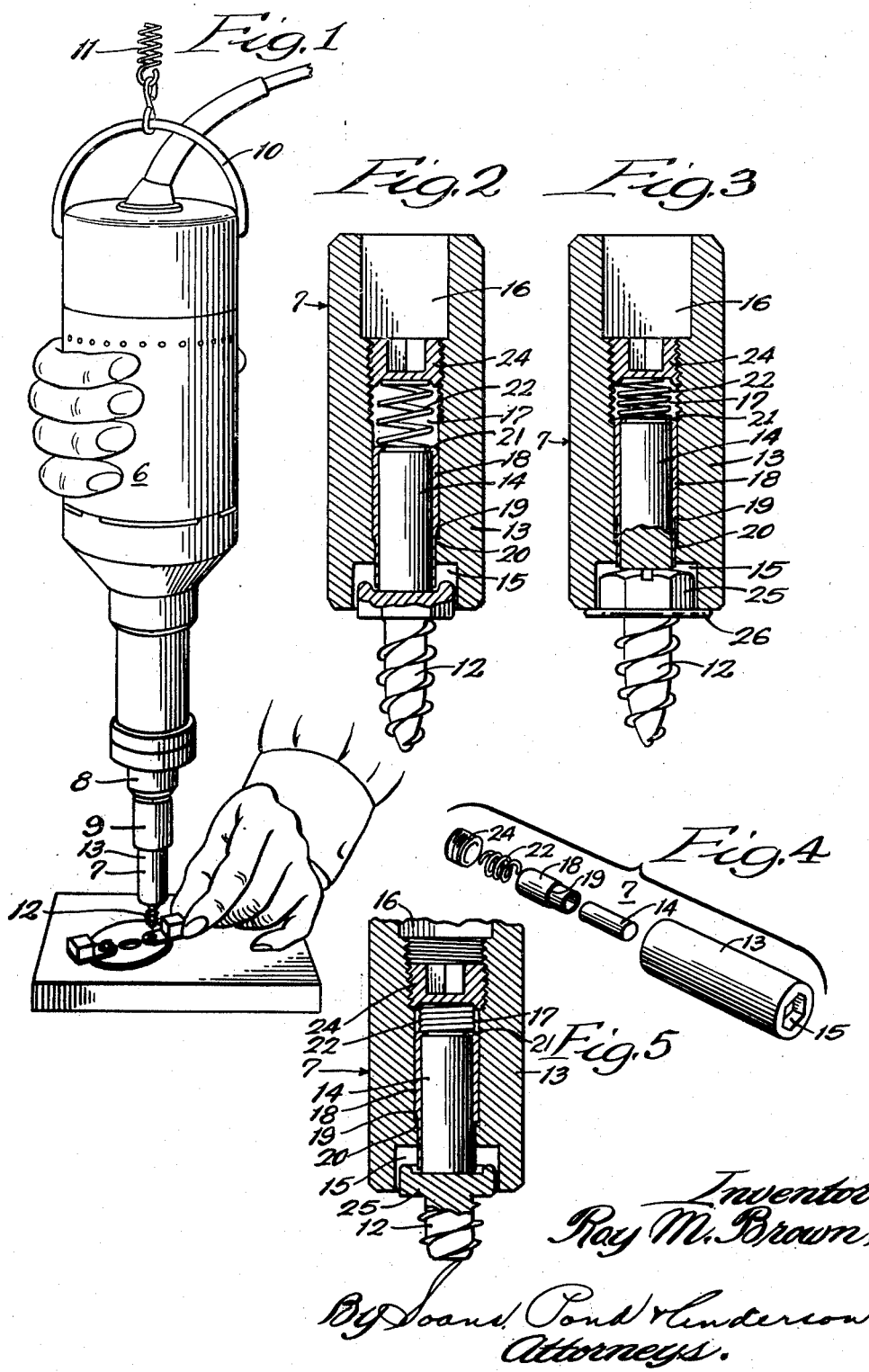
Inventor:
Ray M. Brown,
By Soans, Pond & Anderson
Attorneys.

Patented Mar. 3, 1953

2,630,036

UNITED STATES PATENT OFFICE 2,630,036

MAGNETIC FASTENER-HOLDING DEVICE

Ray M. Brown, Chicago, Ill.

Application September 16, 1948, Serial No. 49,547

6 Claims. (Cl. 81—125)

In the use of power driven tools for securing in place fasteners such as screws, bolts, nuts, and the like, one of the problems is keeping small fasteners in contact with the rotating fastener-holder—commonly designated as a socket or chuck—preliminary to the setting of the fasteners in final position. This is an especially acute problem where there is a very small clearance adjacent the point of attachment of the fastener. The problem is further aggravated where it is not possible to position the fastener on the parts being assembled, which makes it necessary for the fastener to be held in contact with the aforesaid holder while it is rotating and the fastener is being positioned for insertion. This is likely to be possible only if the workman can use the end of one of his fingers. Frequently the working conditions met with will not permit this to be done.

Even when the workman does find it possible to retain the fastener in contact with the fastener-holder by means of a finger it is at the expense of doing rapid assembly which is so important in modern mass production.

The main objects of this invention, therefore, are to provide an improved fastener-holder for power tools whereby the fastener is held by magnetism in functioning relationship with said holder preparatory to the fastener being placed and driven into final set position; to provide an improved construction of such a magnetized fastener-holder which permits the holder to be formed of tough, heat-treated steel alloy of low magnetism retentivity; to provide an improved construction and arrangement of a magnetic core in such a fastener-holder; to provide improved adjustable means for resisting the pressure applied to the end of said core so as to accommodate the holder to use with different types of fasteners and for each ensuring the maximum grip of the holder on the fastener and at the same time ensure the maximum protection of said core against chipping or fragmenting shocks incident to the final setting of the fastener; and to provide an improved fastener-holder of this kind which is simple and economical to manufacture and facile and positive in operation.

In the accompanying drawings,

Fig. 1 shows a power-driven tool, equipped with an improved magnetized fastener-holding device involving this invention, of the type used to secure two metal parts together by means of a screw, the several elements being shown in their various positions just prior to the insertion of the screw into the registering holes of the two metal parts to be fastened together;

Fig. 2 is an enlarged vertical sectional detail of the preferred form of magnetized fastener-holding device, a fastener being shown in the position it occupies before being placed in position to fasten two pieces together;

Fig. 3 is a similar view but showing a fastener in the retracted position it occupies in the holder when the fastener is being turned into its set position;

Fig. 4 is an exploded view of the several parts which make up this improved magnetic fastener-holding device; and Fig. 5 is a view similar to Fig. 2 but showing the magnetic core retaining-plug turned down to so compress the spring that the core is no longer axially shiftable, thus accommodating the holding device to fasteners with shallow heads.

A power tool 6, with which a fastener-holding device 7 embodying this invention is adapted to be used, may be of any standard construction. Generally such a tool comprises a motor-driven chuck 8 to which may be attached a shank 9 for mounting this improved fastener-holding device 7.

The power tool 6 is shown herein suspended by means of a bail 10 from a spring 11 so that the tool may be readily moved toward the work and automatically retracted when released. For many types of work such a suspension is advantageous; however, it is not imperative to the successful and convenient use of an improved fastener-holding device 7 involving this invention. On such a tool the chuck 8 is of course driven by an electric motor (not shown) between which is arranged a suitable clutch (not shown) permitting the motor to overrun the chuck 8 when a fastening means 12 carried by the device 7 has been secured in place. The slippage of the clutch, of course, is only momentary since the operator will withdraw the device 7 from the fastening means 12 as soon as the fastening means has been fully set in place.

The preferred form of fastener-holding device 7, constructed in accordance with this invention, comprises a cylindrical element 13 wherein is yieldingly mounted a magnetic core 14 which coacts to suspend a fastener 12 in position on a power tool 6 and subsequently to rotate the fastener into its final position for securing two or more parts together.

The fastener-holder element 13 is formed with sockets 15 and 16 in the opposite ends between which extends a bore 17. The socket 15 is of non-circular form, preferably hexagonal, so as to receive a similarly-shaped head on a fastener 12. The socket 16 is of such shape as may be required to appropriately secure the element 13 to the shank 9 on the tool chuck 8.

It is necessary to form the element 13 of a highly tough metal, such as a heat-treated steel alloy, in order that the shoulders which define the socket 15 will have adequate resistance to withstand the thrusts to which they are subjected when a fastener 12 reaches the limit of its movement and the torque of the motor continues to be applied through the clutch mechanism of the power-driven tool 6. Being thus formed of tough material, the shoulders which define the socket 15 will not become distorted through being worn away as would be the case with a softer type metal.

The tough metal required for the element 13, for the reason just explained, has low magnetism retentivity. Of itself it cannot be magnetized sufficiently to be practical in directly retaining a fastener 12 in contact therewith during operations preparatory to positioning and setting the fastener. Hence the magnetized core 14 is provided.

This core 14 is formed of standard permanent magnet metal. Its size and location in the element 13 and its magnetization are so related to the dimensions of the socket end of the element 13 that a magnetic saturation of the socket end is attained so that during the normal operation of the power tool 6 a fastener 12 will be held in the socket 15 against displacement by gravity.

The core 14 as herein shown is of cylindrical form. It is encased in a soft metal sheath 18 which slidably supports the core in the bore 17. The lower end of the sheath is milled to provide a shoulder 19 adapted to co-act with a shoulder 20 in the bore 17 so that the lower end of the sheathed core 14 protrudes the desired distance into the socket 15. The upper end of the sheath is formed over the end of the core as shown at 21.

The sheath 18 serves to not only protect the lower end of the core 14 from chipping but also to lessen the likelihood of the core 14 fragmenting or disintegrating as a result of the shocks to which the core 14 and element 13 are incessantly subjected as fasteners 12 are successively set in place by the fast rotating chuck 8 of the tool 6.

A spring 22, inserted between the core 14 and a threaded plug 24 screwed into the upper end of the bore 17, yieldingly positions the core 14 in the element 13. Such a spring serves a three-fold purpose.

In the first place, it holds the core shoulder 19 in contact with the element shoulder 20 and thus appropriately protrudes the end of the core 14 into the socket element 13. This positions the core 14 so that the pull of the magnetic field is at its maximum.

In the second place, by adjusting the plug 24 axially of the element 13 the core 14 may be so positioned that just the right amount of retraction thereof will occur when a fastener 12 is first inserted into the work as will ensure the proper recession of the head of the fastener into the socket 15. This materially lessens the likelihood of the shoulders of the socket 15 being worn away by the shock that occurs from the suddenly-arrested movement of the fastener 12 as it reaches the limit of its rotation into the work.

Fig. 2 illustrates the position of a fastener 12 at the time it is picked up by the magnet 14 whereas Fig. 3 illustrates the recession of the fastener head 25 that has occurred at the time the fastener is inserted into the work apertures.

Fig. 5 shows the plug 24 adjusted to completely compress the spring 22 so as to accommodate a fastener 12 with a head 25 more shallow than that shown in Figs. 2 and 3.

When fasteners 12, of the type shown in Figs. 2 and 3, are used the flange 26 obviously limits the depression of the fastener head 25 into the socket 15.

In the third place, the spring absorbs the shocks that would otherwise be received by the core 14—if it were fixed in the element 13—at the instant a fastener 12 reaches the limit of its rotary movement in the work. Such a dissipation of these shocks practically eliminates chipping the end of the core 14 or any other fragmenting thereof.

Variations and modifications in the details of structure and arrangement of the parts may be resorted to within the spirit and coverage of the appended claims.

I claim:

1. A device comprising an element formed at one end with a non-circular socket and formed at the other end for attachment to a tool chuck, said element being made of steel alloy having low magnetic retentivity and which is incapable of being substantially permanently magnetized, a magnetic core arranged for axial movement in said element, a bushing enveloping said core and slidably supporting said core in said element, co-acting shoulders on said bushing and said element for positioning said core to locate the end thereof in said socket, and resilient means interposed between said element and core to yieldingly resist pressure applied to the end of said core and permit said core to recede from said socket.

2. A device comprising an element formed at one end with a non-circular socket and formed at the other end for attachment to a tool chuck, a magnetic core arranged for axial movement in said element with one end normally protruding into said socket, an adjustable threaded member secured in said bore, and a spring interposed between said threaded member and said core to yieldingly resist pressure applied to the end of said core and permit said core to recede from said socket.

3. A device comprising a cylindrical element formed at one end with a non-circular socket and formed at the other end for attachment to a tool and having a bore extending axially through said element, said element being made of magnetic material, a magnetized core arranged in said bore, co-acting shoulders on said element and said core for positioning said core with the end thereof protruding partially into said element socket, an adjustable threaded member secured in the upper end of said element bore, and resilient means interposed between said core and said threaded member to yieldingly resist pressure applied to the end of said core and permit said core to recede from said socket.

4. A magnetic tool comprising an elongated holder adapted to have a shank attached thereto by means of which the tool may be rotated, said holder having a longitudinal bore which is of non-circular cross section at one end thereof, a bar magnet with the poles at opposite ends thereof movably mounted within said bore and having the outer end thereof spaced inwardly from said one end of said holder, said end of non-circular cross section constituting a socket to receive a shank of similar cross sectional shape of a member of magnetic material whereby such shank may be held in said socket by said magnet and rotated by said holder, and yieldable means within said bore to yieldingly resist inward movement of said bar magnet, and cooperating shoulders within said bore and on said magnet to limit outward movement of the magnet.

5. A magnetic tool comprising an elongated holder formed at one end for attachment to a shank by means of which the tool may be rotated and having at the other end a socket which is of non-circular cross section, a longitudinal bore in said holder, an elongated member having magnetic properties secured in said bore and arranged for axial movement therein, coacting means between said member and said bore for positioning said member to locate the end thereof in said socket, and resilient means interposed between said holder and said member yieldingly to resist pressure applied to the end of said member and permit said member to recede from said socket.

6. A device comprising an elongated holder adapted to have a shank attached to one end thereof by means of which the holder may be rotated and having a non-circular socket at the other end thereof, a magnetic core arranged for axial movement in said holder, a bushing enveloping said core and slidably supporting said core in said holder, coacting shoulders on said bushing and said holder for positioning said core to locate the end thereof in said socket, and resilient means interposed between said holder and core yieldingly to resist pressure applied to the end of said core and permit said core to recede from said socket.

RAY M. BROWN.

REFERENCES CITED

The following references are of record in the file of this patent:

UNITED STATES PATENTS

| Number | Name | Date |
| --- | --- | --- |
| 512,381 | Keys | Jan. 9, 1894 |
| 1,450,203 | Brown | Apr. 3, 1923 |
| 1,492,908 | Trumbo | May 6, 1924 |
| 2,260,055 | Reardon | Oct. 21, 1941 |

FOREIGN PATENTS

| Number | Country | Date |
| --- | --- | --- |
| 474,971 | Germany | Apr. 16, 1929 |